United States Patent Office 3,284,358
Patented Nov. 8, 1966

3,284,358

PROCESS FOR IMPROVING THE MAGNETIC PROPERTIES OF COLLOIDAL DISPERSION OF MAGNETIC PARTICLES

John R. Thomas, Lafayette, and Joe B. Lavigne, Berkeley, Calif., assignors to Chevron Research Company, San Francisco, Calif., a corporation of Delaware No Drawing. Filed June 10, 1963, Ser. No. 286,503
10 Claims. (Cl. 252—62.5)

This invention concerns the improvement of magnetic properties by physical treatment of colloidal suspensions of small discrete ferromagnetic particles. More particularly, this invention concerns treating at elevated temperatures and/or pressures a colloidal solution of ferromagnetic particles which are encapsulated in a polymeric enevlope.

Stable dispersions of ferromagnetic metals have been obtained by decomposing an organo-metallic compound in the presence of a polymer and an inert solvent of relatively low dielectric constant. The particles obtained are usually in a size range of about 10 to 1,000 A., single domain and encapsulated in a polymeric envelope. A description of their method of preparation and the compositions is found in application No. 249,323, now abandoned, and U.S. Patents Nos. 3,228,881 and 3,228,882.

The compositions find a wide variety of applications because of their unique properties. The particles have higher magnetic induction and coercive forces than ferric oxide, are single domain and discrete by virtue of the polymeric envelope. Moreover, preferred embodiments of these particles have the particles existing as linear arrangements similar to streptococci. In many applications, coercive forces are desired which are higher than those obtained as prepared. This is particularly true in various applications, such as in permanent magnets, where high coercive force generally implies a high energy product maximum $(BH)_{max}$, preferably in the range of $10^{+6}$ to $10^{+7}$.

It has now been found that the coercivity of the particles may be significantly enhanced by heating the dispersions of the particles at elevated temperatures in an inert atmosphere and preferably at elevated pressures.

The dispersion consists of the metal particles, polymer and an inert solvent. The particles are metals of atomic number 26–28, i.e., iron, cobalt, and nickel. The particles are of a size in the range of about 10 to 1,000 A., preferably 100 to 750 A., are discrete, single domain and encapsulated in a polymeric envelope. They are generally homogeneously distributed in inert solvent of relatively low dielectric constant, preferably about 1.7 to 6.0. Usually the solvents are hydrocarbon, halohydrocarbon, ethers, ketones, etc., but are preferably hydrocarbon, and more preferred, aromatic hydrocarbon. The weight of the metal will usually be in the range of about 0.5 to 25% by weight of the total composition, and more usually in the range of about 1 to 10% by weight. The weight ratio of metal to polymer will customarily be in the range of 50:50–98:2, more generally, in the range 70:30–95:5.

The type of polymer may be varied widely, being either addition or condensation-type polymers. Included in the range of polymers are polyacrylates, polyvinyl esters, polychloroprene, polyvinyl chloride, polychlorinated ethylene having some sulfonamido groups, polyethylene oxides, and various other addition and condensation polymers. The preferred polymers are addition polyesters, e.g., acrylates and vinyl esters, which may or may not contain from 0.5 to 10% of other types of monomers. Particularly preferred are the polyacrylates. By acrylates it is intended to include the derivatives of acrylic acid, methacrylic acid and other addition polymerizable acrylic acids and their derivatives and their copolymers, at least 70% by number of monomer groups being derived from acrylates.

The temperatures used to increase the coercive force must be at least 35° C. and will generally be in the range of about 50° C. to 250° C. More commonly, the temperature will be in the range of about 60° C. to 225° C. With lower temperatures it is preferred to use higher pressures.

The atmosphere should be inert, that is, relatively free of oxygen. By inert is intended chemically unreactive to the metal, for in the presence of hydrogen, the metal acts as a reduction catalyst. It is found that oxygen does react with the metal which has a high chemical reactivity. Gases which can be used are helium, ethane, hydrogen, nitrogen, methane, etc., but preferred atmospheres are those containing nitrogen gas or hydrogen gas.

The thermal treatment may be carried out at atmospheric pressure as initial pressure (15 p.s.i. at 20° C.), but is greatly enhanced and the method is preferred when elevated pressures are used. Pressures at room temperature (20° C.) of at least 50 p.s.i. and preferably 150 p.s.i. are preferred. Usually, the pressure will be in the range of about 200 to 2,000 p.s.i. (20° C.). When lower temperatures are used, those in the range of 35° C. to 100° C., it is particularly preferred to use elevated pressures, preferably above 150 p.s.i. (20° C.). It is found that when hydrogen gas is used, the metal, particularly cobalt, can act as a hydrogenation catalyst for solvents susceptible to reduction, e.g., aromatic solvents, ketones, or halohydrocarbons, etc. It is preferred, therefore, that halohydrocarbons are not used when hydrogen gas is used.

At high metal to polymer ratios, i.e., greater than 90:10, the effect of pressure is diminished. Therefore, with high metal to polymer ratios in some instances there will be little advantage in also having elevated pressure as measured at 20° C. Preferably, therefore, the pressure varies inversely with the temperature.

The time will vary with the temperature and pressure used. Usually, the treatment will be carried out for at least 5 minutes and preferably more. If desired, the temperature and pressure may be increased incrementally rather than using a constant temperature or pressure. Times will usually vary in the range of about 5 minutes to 24 hours, preferably in the range of about 30 minutes to 10 hours (600 minutes).

The treatment is carried out by introducing the metal particle dispersion into a vessel which has been purged with an inert gas. If the treatment consists only of heating, it is preferred that the temperature does not exceed the reflux temperature of the solvent, or a closed system can be used with the autogenous pressure. When elevated pressures are being used, the vessel should be able to sustain the high pressure. The vessel can then be pressurized to the desired pressure, sealed off and heated to the desired temperature. When hydrogen is being used with a solvent which can be hydrogenated, the system should be repressurized repeatedly. After a sufficient time, heating may be stopped, the gases vented and the treated dispersion isolated.

The following examples are offered by way of illustration and not by way of limitation.

The treatment was carried out in the following manner:

The material to be treated was placed in a shaker bomb. The bomb was then brought to the pressure indicated in the following table by charging with the indicated gas. The mixture was then brought to the treatment temperature by heating at a rate of about 2 to 3° C. per minute and the temperature maintained for the desired time. After cooling and venting the high-pressure gas, the treated products were recovered.

Occasionally, samples were taken during the course of the run, usually when the conditions were being varied with the same sample. When samples were taken, the metal was allowed to cool to approximately room temperature, the bomb vented, and the sample removed. The bomb was then repressured and heated to the desired temperature. The samples were prepared as subsequently described. The magnetic properties of the dried samples were then measured with a B–H meter. The following table demonstrates the effect of temperature and pressure.

TABLE I

| Wt. ratio Co metal/Polymer | Percent Co in Total Comp. | | Polymer [1] | Gas [2] | Pressure [3] p.s.i. at 20° C. | Temp.[4] ° C. | Time, Min. | $Hc_{2000}$ [5] | | Br/Bm | |
|---|---|---|---|---|---|---|---|---|---|---|---|
| | w./w. | g./100 ml. | | | | | | Before | After | Before | After |
| 75/25 | 4.4 | | VI | H | 1,000 | 120 | 60 | 560 | 800 | 0.66 | |
| 75/25 | 4.4 | | VI | H | 1,000 | 110 | 62 | 560 | 1,140 | 0.66 | 0.67 |
| 75/25 | 4.4 | | VI | H | 1,000 | 90 | 12 | 560 | 930 | 0.66 | 0.51 |
| 75/25 | 1.5 | | VI | N | 1,000 | 110 | 61 | 560 | 1,150 | 0.66 | 0.66 |
| 75/25 | | 3.2 | I | H | 975 | | | | | | |
| | | | | | 1,210 | \ | 95 | | | | |
| | | | | | 125 | 150 | 30 | | | | |
| | | | | | 175 | 16.3 | 30 | 203 | 606 | 0.53 | 0.52 |
| | | | | | 975 | | | | | | |
| 76/25 (Co+Fe)[7] | | 3.0 | II | H | 975 | 50 | | | | | |
| | | | | | | \ | 120 | | | | |
| 75/25 | | 3.2 | I | H | | 215 | 180 | 40 | 338 | 0.20 | 0.30 |
| | | | | | 1,000 | | 30 | | | | |
| | | | | | | 70 | 60 | 200 | 738 | 0.57 | 0.62 |
| | | | | | | | 30 | | | | |
| | | | | | 770 | 90 | 60 | | 907 | | |
| | | | | | 200 | \ | 75 | | | | |
| | | | | | | 130 | 60 | | 841 | | 0.50 |
| 75/25 | | 3.2 | I | H | 200 | 20 | 60 | 216 | 330 | 0.54 | 0.56 |
| | | | | | 1,000 | | 75 | | 332 | | 0.55 |
| | | | | | | \ | 30 | | | | |
| | | | | | | 50 | 60 | | 369 | | 0.60 |
| | | | | | | | 60 | | 360 | | 0.60 |
| 75/25 | | 3.2 | III | H | 1,000 | 20 | 60 | 164 | 185 | 0.38 | 0.37 |
| | | | | | | \ | 85 | | | | |
| | | | | | | 50 | | | 252 | | 0.40 |
| | | | | | | \ | 60 | | | | |
| | | | | | | 90 | 70 | | 808 | | 0.58 |
| 75/25 | | 3.2 | I:IV (1:2) | H | 1,000 | \ | 35 | | | | |
| | | | | | | 50 | 25 | 0 | 30.8 | | |
| | | | | | | \ | 75 | | | | |
| | | | | | | 70 | 70 | | 88.4 | | |
| | | | | | | \ | 30 | | | | |
| | | | | | | 95 | 60 | | 396 | | |
| 80/20 | | 4.3 | V | H | 500 | 150 | 150 | 317 | 877 | 0. | 055.59 |
| 80/20 [8] | | 4.1 | I | H | 570 | 150 | 50 | 479 | 892 | 0.61 | 0.65 |

[1] I—Methyl methacrylate:ethyl acrylate:vinyl pyrrolidone (35:65:1); ~5×10^5 molecular weight; II—Lauryl methacrylate:vinyl pyrrolidone (101) (Acryloid 917); III—Methyl methacrylate:ethyl acrylate:hydroxyethyl methacrylate (35:70:1); ~1×10^5 molecular weight; IV—Methyl methacrylate vinyl pyrrolidone (1:1); ~1×10^5 molecular weight; V—Ethyl acrylate:vinyl pyrrolidone (100:1); ~1×10^5 molecular weight; VI—Ethyl acrylate:methy methacrylate:vinyl pyrrolidone (72:39:1).

[2] H—Hydrogen; N—Nitrogen.

[3] The pressure indicates the initial pressure. When hydrogen was used, the pressure dropped because of reaction with the solvent and possibly polymer. In those examples in which the pressure was recharged and samples taken, the temperature was first allowed to drop to about room temperature <50° C., the samples taken, the pressure bomb recharged to the pressure indicated and the system heated to the indicated temperature.

[4] The temperature is reported for the duration of the time indicated. The \ indicates that the mixture was being heated to the next temperature stated during the period indicated in the time column.

[5] Intrinsic coercive force as measured with a B–H meter, the reverse field necessary to bring the quantity B–H back to zero. The polymeric composition of metal particles is spread on a Mylar base and at thickness of about 0.1–0.2 ml. dry thickness. It is measured in oersteds in a 2000 oe. field.

[6] Br/Bm—Remanence ratio.

[7] Iron-cobalt alloy, 10 g. $Co_2(CO)_8$ and 10 ml. $Fe(CO)_5$ decomposed simultaneously.

[8] The sol when prepared was centrifuged, yielding 75 ml. of a concentrate which was redispersed in 600 ml. dry methyl ethyl ketone. This sample was treated as described in the table. The product resulting from the treatment was precipitated by passing the sample through a magnetic field, see J. B. Lavigne, copending application Serial No. 295,502, filed July 16, 1963, and washed with methyl ethyl ketone to a Co/polymer weight ratio of about 90/10. The slurry was oriented and dried (by passing a continuous stream of nitrogen over the slurry) in a 5,000 g. field. A mass of magnetically oriented fibers was obtained. Hysteresis loops were determined on the fibers and a billet obtained by powdering the fibers and pressing the powder while oriented in a 5,000 oe. field. The energy product $(BH)_{max}$ was determined from the demagnetization curve.

Fiber properties $H_{ic}$ 5,000 oe.=1,360 oe.; $(BH)_{max}=2.91\times10^6$.

Billet properties $H_{ic}$ 5,000 oe.=1,260 oe.; $(BH)_{max}=1.84\times10^6$.

The following table is concerned with the effect of temperature alone. The runs were carried out in a nitrogen atmosphere.

TABLE II

| Wt. ratio Co metal/polymer | Percent Co in Total Comp. | Polymer Sample [1] | Maximum Pressure p.s.i.[2] | Temp., ° C. | Time, Min. | $H_c$[3] | | Br/Bm[4] | |
|---|---|---|---|---|---|---|---|---|---|
| | | | | | | Before | After | Before | After |
| 88/12 | 2 | 1 | ---------- | 143 | 725 | 462 | 543 | 0.63 | 0.68 |
| 88/12 | 2 | 1 | ---------- | 203 | 485 | 462 | 912 | 0.63 | 0.63 |
| 88/12 | 6 | 2 | ---------- | 203 | 440 | 458 | 630 | 0.56 | 0.58 |
| 92/8 | 6 | 3 | 150 | 194 | 520 | 458 | 788 | 0.56 | 0.60 |
| 92/8 | 6 | 3 | 200 | 196 | 490 | 458 | 769 | 0.56 | 0.66 |
| 92/8 | 4 | 3 | 200 | 198 | 530 | 458 | 700 | 0.56 | 0.62 |
| 92/8 | 6 | 3 | 200 | 177 | 575 | 458 | 581 | 0.56 | 0.53 |
| 92/8 | 6 | 3 | 200 | 191 | 535 | 458 | 711 | 0.56 | 0.64 |
| 92/8 | 6 | 3 | 225 | 192 | 25 | 458 | 658 | 0.56 | 0.58 |
| 92/8 | 6 | 3 | 300 | 214 | 440 | 458 | 704 | 0.56 | 0.58 |
| 92/8 | 6 | 4 | 200 | 198 | 30 | 515 | 827 | 0.54 | 0.64 |
| 92/8 | 6 | 4 | 240 | 191 | 2 | 515 | 546 | 0.54 | 0.63 |
| 88/12 | 5 | 5 | 400 | 201 | 30 | 954 | 1,011 | 0.68 | 0.71 |
| 70/30 | 5 | 5 | 400 | 194 | 60 | 534 | 715 | 0.67 | 0.66 |

[1] Polymer samples 1–4 and 6 all use the same polymer: ethyl acrylate:methyl methacrylate:vinyl pyrrolidone (39:72:1)~10 molecular weight. Sample 5 uses neoprene polymer (polychloroprene)~$10^5$ molecular weight. The same sample number means aliquots were taken from the same preparation.

[2] The autogenous pressure of the system.

[3] Intrinsic coercive force at 2,000 oe.

[4] Br/Bm—remanence ratio at 2,000 oe.

Of course, since a sealed system is used, the pressure in the vessel at the elevated temperature is much above atmospheric. However, the pressure at room temperature (20° C.) is atmospheric and the pressure of the system is merely the autogenous pressure. The autogenous pressure is reported in the table.

*Example A*

The following example is illustrative of the preparation of the cobalt metal suspensions. A mixture of 23.5 grams of dicobalt octacarbonyl, 2.7 grams of a terpolymer of methyl methacrylate, ethyl acrylate and vinyl pyrrolidone (mol ratio approximately 35:65:1, molecular weight approximately 500,000) and 235 grams of toluene were mixed and heated under reflux until the evolution of carbon monoxide had ceased. The product was then ready to be used directly.

When higher metal to polymer ratios—than obtained directly in the preparation—were used, these were obtained by concentrating the colloidal suspension by passing the suspension through a magnetic field, then centrifuging, decanting and extracting the concentrate with a ketonic or halohydrocarbon solvent.

*Example B*

The following example is illustrative of the preparation of the iron metal suspensions. A mixture of 3 grams of polyhexylmethacrylate, 25 cc. of $Fe(CO)_5$ (iron pentacarbonyl) and 500 ml. of dry xylene was heated at reflux for 14 hours till all of the carbon monoxide had evolved. The product as measured in a B–H meter at 2,000 oe. had a coercive force of 325 oersteds and a remanence ratio (B*r*/B*m*) of 0.54.

The above product was charged to a 1300 cc. bomb and pressurized with $H_2$ to 1500 p.s.i. at 170° C. for 28 hours. The coercive force had increased to 730 oe., while the remanence ratio was 0.5.

As evident from the table, significant enhancement of the coercive force is obtained by thermal treatment, particularly when augmented with elevated pressures. Even at relatively low temperatures, pressures are also effective, although not as effective as when combined with the temperature.

The improved coercive force and maximum energy product provides magnetic compositions which are particularly useful for tapes, which should not be influenced by extraneous fields, and for permanent magnets, providing a light, easily moldable, strongly magnetic material.

As will be evident to those skilled in the art, various modifications on this process can be made or followed, in the light of the foregoing disclosure and discussion, without departing from the spirit or scope of the disclosure or from the scope of the following claims.

We claim:

1. A method of improving the magnetic properties of a stable dispersion of particles of metals of atomic number 26 to 28, wherein said metal particles are of a size in the range of about 10 to 1,000 A., encapsulated in a polymeric envelope and are dispersed in a solvent of dielectric constant in the range of about 1.7 to 6.0 and are present in an amount of from about 0.5 to 25% by weight of the total composition, which comprises heating at a temperature in the range of about 35° C. to 250° C. in an atmosphere of an inert gas.

2. A method according to claim 1, wherein said inert gas is selected from the group consisting of hydrogen and nitrogen at a pressure when measured at 20° C. in the range of about 15 to 2,000 p.s.i.

3. A method according to claim 2, wherein the temperature is in the range of about 50° C. to 250° C. and the pressure is in the range of about 150 to 2,000 p.s.i.

4. A method according to claim 2, wherein the pressure is varied inversely to the temperature.

5. A method according to claim 1, wherein the metal is cobalt.

6. A method according to claim 1, wherein the temperature is in the range of about 60° C. to 225° C. and the pressure is in the range of about 200 to 2,000 p.s.i.

7. A method of improving the magnetic properties of a stable dispersion of particles of metals of atomic number 26 to 28, wherein said metal particles are of a size in the range of about 10 to 1,000 A. and encapsulated in a polymeric envelope, are dispersed in an aromatic hydrocarbon and are present in an amount of from about 0.5 to 25% by weight of the total composition which comprises heating at a temperature in the range of about 50° C. to 250° C., in an atmosphere of a gas selected from the group consisting of nitrogen and hydrogen at a pressure in the range of about 50 to 2,000 p.s.i.

8. A method according to claim 7, wherein said polymer is an acrylate.

9. A method according to claim 7, wherein the gas is hydrogen and the metal is cobalt.

10. A method according to claim 7, wherein the gas is hydrogen and the metal is iron.

References Cited by the Examiner

UNITED STATES PATENTS 2,744,040 5/1956 Altman ---------- 252—62.5

TOBIAS E. LEVOW, *Primary Examiner.*

R. D. EDMONDS, *Assistant Examiner.*